(12) United States Patent
De Sousa et al.

(10) Patent No.: US 8,823,296 B2
(45) Date of Patent: Sep. 2, 2014

(54) COMBINED ELECTRIC DEVICE FOR POWERING AND CHARGING

(71) Applicant: Valeo Systemes de Controle Moteur, Cergy Pontoise Cedex (FR)

(72) Inventors: Luis De Sousa, Eragny sur Oise (FR); Boris Bouchez, Cergy (FR)

(73) Assignee: Valeo Systemes de Controle Moteur, Cergy Pontoise Cedex (FR)

(*) Notice: Subject to any disclaimer, the term of this patent is extended or adjusted under 35 U.S.C. 154(b) by 0 days.

(21) Appl. No.: 14/012,162

(22) Filed: Aug. 28, 2013

(65) Prior Publication Data
US 2013/0342135 A1 Dec. 26, 2013

Related U.S. Application Data

(63) Continuation of application No. 13/127,850, filed as application No. PCT/EP2009/065334 on Nov. 17, 2009, now Pat. No. 8,610,383.

(30) Foreign Application Priority Data

Nov. 18, 2008 (FR) ..................................... 08 06455

(51) Int. Cl.
*H02J 1/00* (2006.01)
*H02P 6/14* (2006.01)
*B60L 11/18* (2006.01)
*B60W 10/08* (2006.01)
*B60L 15/00* (2006.01)
*H02J 7/02* (2006.01)

(52) U.S. Cl.
CPC ............... *H02P 6/14* (2013.01); *B60L 11/1811* (2013.01); *Y02T 90/127* (2013.01); *Y02T 10/7005* (2013.01); *B60W 10/08* (2013.01); *B60L 2220/54* (2013.01); *Y02T 10/7088* (2013.01); *Y02T 90/14* (2013.01); *Y02T 10/641* (2013.01); *B60L 11/1814* (2013.01); *B60L 15/007* (2013.01); *H02J 7/022* (2013.01); *Y02T 10/644* (2013.01); *B60L 11/1803* (2013.01)
USPC ........... 318/139; 318/801; 318/800; 318/799; 318/798; 318/767

(58) Field of Classification Search
CPC .. H02J 7/022; B60L 11/1803; B60L 11/1814; B60L 2220/54
USPC .......... 318/139, 727, 767, 798, 799, 800, 801
See application file for complete search history.

(56) References Cited

U.S. PATENT DOCUMENTS

| | | | | |
|---|---|---|---|---|
| 5,619,107 A * | 4/1997 | Shinohara et al. | ............ | 318/139 |
| 5,917,295 A * | 6/1999 | Mongeau | ................ | 318/400.29 |
| 6,372,987 B1 * | 4/2002 | Ha | ................... | 174/67 |
| 7,119,513 B2 * | 10/2006 | Ishikawa | ....................... | 318/801 |
| 7,372,222 B2 | 5/2008 | Ishikawa et al. | | |
| 7,427,849 B2 * | 9/2008 | Kaneko et al. | ................ | 318/801 |
| 7,948,141 B2 * | 5/2011 | Takeuchi | ....................... | 310/191 |

FOREIGN PATENT DOCUMENTS

| | | |
|---|---|---|
| JP | H08-126121 A | 5/1996 |
| JP | 2004336836 A | 11/2004 |
| JP | 2007097341 A | 4/2007 |
| WO | 2005091488 A1 | 9/2005 |

OTHER PUBLICATIONS

Office Action issued in corresponding Japanese application 2011-543771 along with english language communication reporting the same; dated Aug. 28, 2013 (8 pages).
Office Action issued in corresponding Japanese application 2011-543770 along with english language communication reporting the same; dated Sep. 2, 2013 (23 pages).

* cited by examiner

*Primary Examiner* — David Luo
(74) *Attorney, Agent, or Firm* — Osha Liang LLP

(57) ABSTRACT

The invention relates to a combined method and device for powering and charging, wherein said device comprises an AC motor (6), a converter (2), storage means (5), and switching means (4) either for enabling the powering of the motor (6) or for enabling the charging of the storage means (5) by the converter (2). The switching means (4) is integrated in the converter (2) and includes at least one H-shaped bridge structure (3) for each phase of the motor (6).

13 Claims, 2 Drawing Sheets

COMBINED ELECTRIC DEVICE FOR POWERING AND CHARGING

CROSS-REFERENCE TO RELATED APPLICATIONS

The present application is a continuation of application U.S. patent application Ser. No. 13/127,850 filed on May 5, 2011, which is a national stage application of PCT/EP2009/065334 filed Nov. 17, 2009, which claims priority to French Patent Application No. 2008-0806455, filed Nov. 18, 2008. The priority application is hereby incorporated by reference in its entirety.

The present invention relates to a combined electric device for powering and charging and an associated method and is situated in the field of motors or alternators powered by rechargeable batteries.

Advantageously the invention will find application in the field of electric motor vehicles wherein the batteries can power the motor via an inverter and be recharged when the motor vehicle is stopped.

However, although particularly designed for such an application, the device and the associated method can be used in other fields and notably in devices for generating energy of the wind-power or hydraulic type.

BACKGROUND OF THE INVENTION

Conventionally an electric vehicle is fitted with high-voltage batteries delivering a direct current to an inverter which converts this direct current into an alternating current making it possible to power an electric motor, the latter setting the vehicle in motion.

So as to recharge these high-voltage batteries, it is known practice to fit the vehicle with an onboard charging device essentially comprising an alternating current-direct current converter making it possible to rectify the alternating power of the electricity network in order to charge the batteries. Advantageously, the device also comprises a direct current-direct current converter ensuring that the voltage level of the network is matched to that of the batteries.

The electronic components of the powering system on the one hand and of the charging system on the other hand are costly.

Moreover, the motor is powered and the batteries are charged at different phases so it has been proposed, in applications EP 0 603 778 and WO97/08009, to reuse a portion of the motor and of the components used to power it in order to produce the device for charging the batteries.

Accordingly, the device for charging the batteries uses the inverter to form an alternating current-direct current converter and the windings of the motor to form the inductors. The transition from the motor-powering mode to that of charging the batteries is carried out by power contactors by disconnecting the neutral.

Using power connectors is however problematic in the sense that, conveying the currents of the electric machine, they must be oversized. Specifically, as an example, a 50 kW traction system powered by 345 V nominal batteries may require a current of approximately 350 A root mean square in order to provide a maximum torque. If the rotor blocks up, this current may reach a peak of 500 A while sustaining vibrations and impacts to which motor vehicles according to the applicable standards may be subjected.

OBJECT OF THE INVENTION

The object of the present invention is to propose a device and a method making it possible to power the motor and charge the battery by using elements of the motor and of the inverter, and such that the device has a structure making it possible to dispense with the power contactors for the transition between the powering and charging modes.

SUMMARY OF THE INVENTION

Accordingly, the combined electric device for powering and charging comprises an alternating-current motor, an inverter and accumulation means, the device also comprises switching means making it possible either to allow the powering of the motor or to allow the charging of the accumulation means by the inverter. The switching means are incorporated into the inverter and comprise at least one H-bridge structure, for each phase of the motor, making it possible to maintain the neutral connection of each phase of the motor when the accumulation means are charged.

The electric device may also comprise a DC/DC (direct current-direct current) converter between the H bridges and the accumulation means making it possible to match the voltage of the outside power supply network to the characteristics of the accumulation means.

If the motor is a three-phase motor, the switching means advantageously comprise three H bridges.

Locking means making it possible to prevent access to the electric power outlet for connection to the outside network in the event of the device being powered up can be provided.

The electric power outlet may also provide grounding of the electric device.

Another subject of the invention is a combined powering and charging method for the application of the device described above, comprising a step for controlling the switching means of said at least one H bridge making it possible to switch from a mode for powering the motor to a mode for charging the accumulation means and vice versa.

In the case of a three-phase motor, the method may comprise a step, in the event of loss of one phase of the motor, of controlling inversion of one of the other two phases so as to generate a single rotating field with constant amplitude.

BRIEF DESCRIPTION OF THE DRAWINGS

The present invention will be better understood on reading a detailed example of embodiment with reference to the appended drawings, supplied as a nonlimiting example, amongst which.

DETAILED DESCRIPTION OF THE INVENTION

Figure 1:
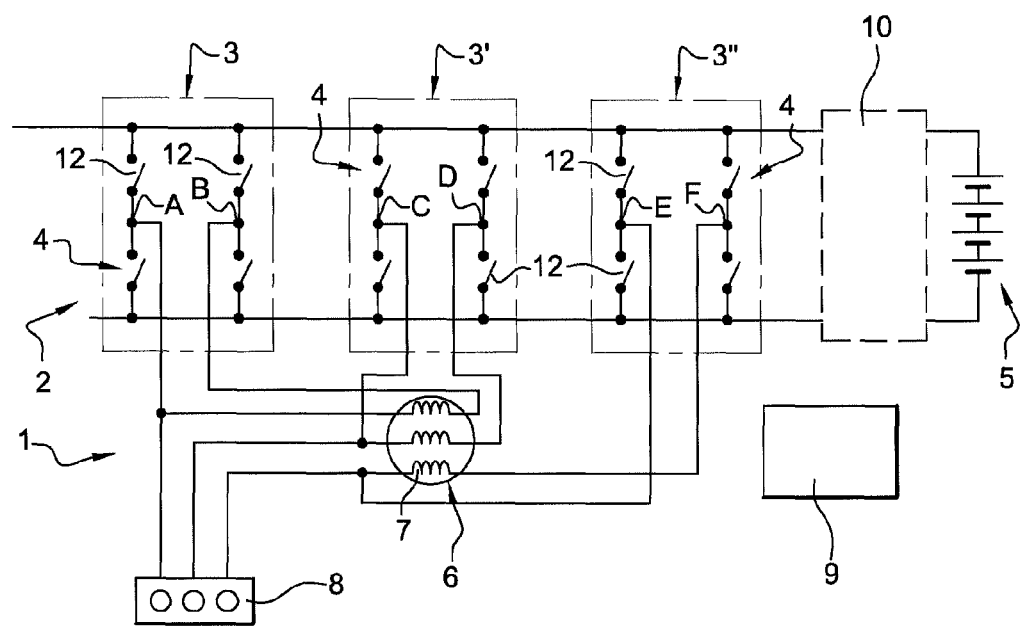
FIG. 1 represents schematically an exemplary embodiment of the device with a three-phase electricity network in a three-phase motor according to the invention.

With reference mainly to FIG. 1, this represents a device 1 according to the invention with an inverter 2 and switching means 4 comprising three H bridges, 3, 3', 3".

This device 1 is designed to operate in two modes:
a powering mode in which it powers with alternating current a motor 6 from a battery 5;
a charging mode in which it charges the battery 5 from the electricity network connected to a connector technology element 8, by using the windings 7 of the motor as an inductor.

Each bridge 3, 3', 3" comprises four switches 12 distributed over arms referenced from A to F. An advantage of the H bridge over the conventional three-phase bridge is that its use doubles the voltage applied to the phases of the motor for one and the same voltage, so that, although comprising double the number of switches 12, the area of silicon used will be identical for the H bridge to that of the conventional three-phase bridge; this is because the phase currents are divided by two.

Using H bridges also makes it possible to reduce losses due to the switchings.

The device 1 also comprises accumulation means 5, a motor 6, shown partially, of which the windings 7 serve as an inductor.

The device 1 also comprises a connector technology element 8 allowing connection to the three-phase electricity network power outlet. This connector technology element comprises locking means, not shown in the appended figures, making it possible to prevent access to the electric power outlet in the event that the device 1 is powered up during the charging mode. The connector technology element 8 is also associated with second locking means (not shown) preventing the user from accessing the conductors (which are then powered up) during the powering mode. The power outlet also provides grounding (not shown) of the device 1. The connector technology element 8 advantageously comprises electromagnetic compatibility filters and conventional protections (not shown) for any apparatus designed to be connected to the electricity network.

The transition from the powering mode to the charging mode is managed by a control circuit 9 which notably drives the switches of the arms A to F (in FIG. 1, the connection between the control circuit 9 and the switches has not been shown to make it easier to read the figure). In powering mode, the control circuit 9 controls all of the arms A, B, C, D, E and F generating three-phase currents in a manner similar to a standard control. In charging mode, only the arms B, D and F are controlled producing, with the inductors 7 of the motor 6 of the electric machine, a voltage elevator.

More precisely, and in the present example, the control circuit 9 drives the arms A to F in the following manner:
  in powering mode, each of the H bridges is controlled so as to allow the flow of an alternating current in the corresponding phase of the motor. The alternating currents flowing in the three phases of the motor are coordinated in conventional manner so that the motor rotates. The switches 12 (which, in the present example, are power transistors) of the branches A and B can be driven according to a conventional sinusoidal PWM (Pulse Width Modulation) control. The other two H bridges are driven in the same manner but out of phase with one another, preferably at 120° in the case of a three-phase motor;
  in three-phase charging mode, the two switches of each of the arms A, C and E are open, while the switches of the arms B, D and F are driven according to a conventional alternating-current control for a three-phase charger so that each inductor is traversed by an alternating current and the PFC (Power Factor Correction) function is performed on all the phases.

The control circuit 9 may also allow operation of the motor 6 in degraded mode. Specifically, if phase is lost following a failure of the motor 6 or of the inverter 2, the control circuit 9 reverses the control of one of the two phases of the motor 6 in operation. This control makes it possible to continue generating a single rotating field of constant amplitude not generating torque inversion, which is impossible with a conventional three-phase device in which the loss of a phase results in strong torque inversions.

With reference to FIG. 1, it can be seen that the device 1 also comprises a DC/DC converter 10 placed between the H bridges and the accumulation means 5. The use of a DC/DC converter 10 makes it possible to match the voltages and consequently to optimize the dimensioning of the inverter without degrading performance. Specifically the voltage of the accumulation means 5 varies with their loads, the variations doubling, the use of a DC/DC converter 10 makes it possible to dimension the inverter 2 for a higher voltage, the latter having to allow half the amount of current to pass.

Figure 2:
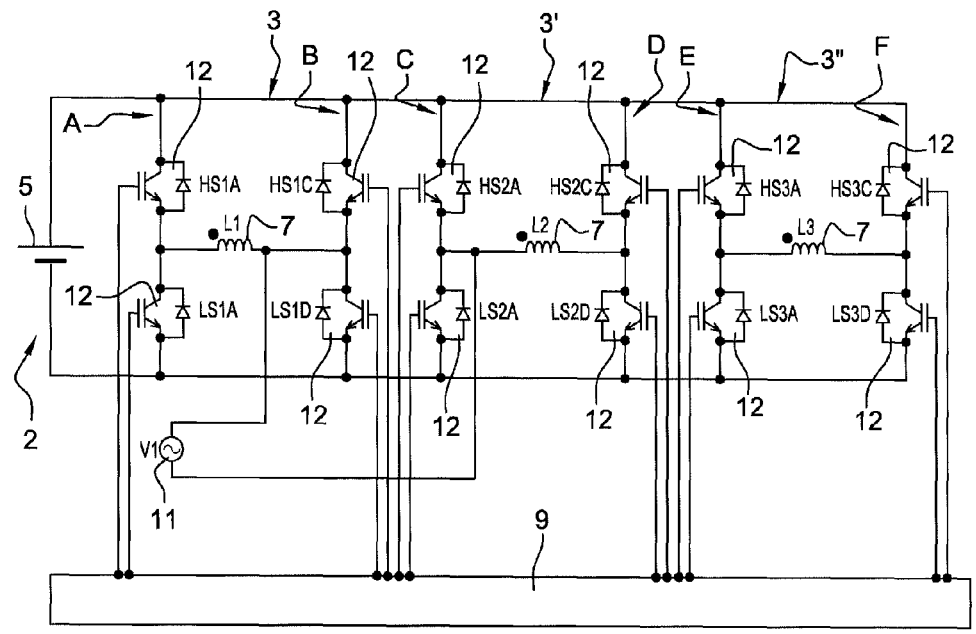
FIG. 2 represents schematically an exemplary embodiment of the connection of a single-phase network in a three-phase inverter.

FIG. 2 shows a three-phase inverter 2 with a single-phase charger.

In the present example, the control circuit 9 can drive the arms A to F in the following manner:
  in powering mode, the same control as for the powering mode of the device of FIG. 1 (see above);
  in charging mode, the arms B, C, E and F are not controlled, that is to say that their switches 12 are all open; and the switches of the arms A and D are driven according to a conventional alternating-current control for a single-phase charger so that each inductor 7 is traversed by a rectified alternating current and the PFC function is performed on the phase concerned.

Figure 3:
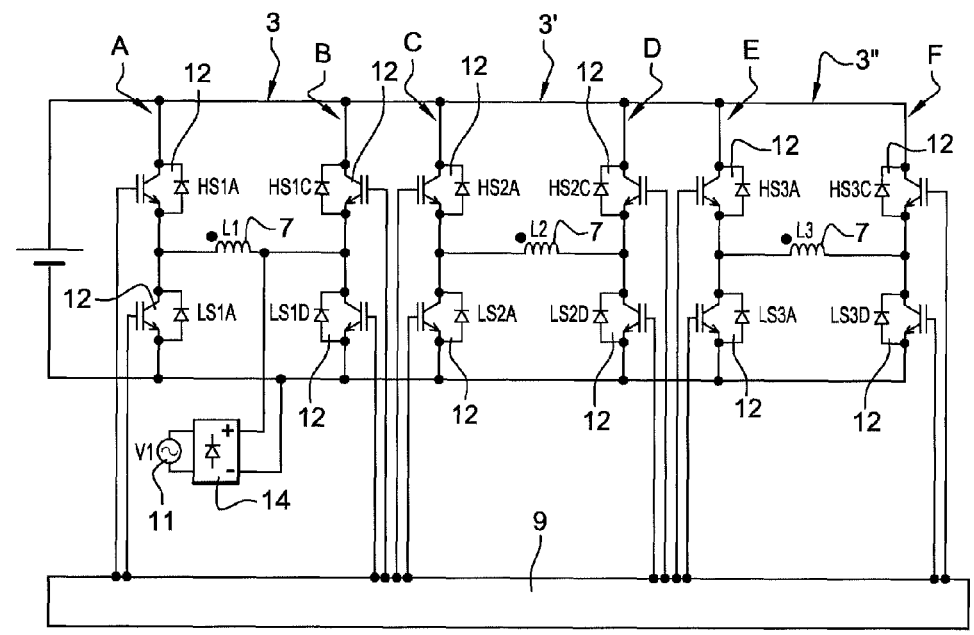
FIG. 3 represents schematically a second exemplary embodiment of the connection of a single-phase network in a three-phase inverter.

FIG. 3 also shows a three-phase inverter with a single-phase charger. In this second solution, the electricity network 11 is connected to the inverter 2 via a bridge rectifier. The electricity network 11 is rectified by a single-phase diode bridge 13.

In this example, the control circuit 9 can drive the arms A to F in the following manner:
  in powering mode, the same control as for the powering mode of the device of FIG. 1 (see above);
  in charging mode, the arms B, C, D, E and F are not controlled and the switches 12 of the arm A are for their part driven according to a conventional alternating-current control for a single-phase charger so that each inductor 7 is traversed by a rectified alternating current and the PFC function is performed on the phase concerned.

Other features of the invention might also be envisaged without departing from the context of the invention defined by the following claims. Notably the device described above can be extended to a polyphase system with an H-bridge structure for each phase of the motor 6.

The invention claimed is:

1. A combined electric device for powering and charging, comprising: an alternating-current motor; an inverter; accumulation means; and switching means for allowing one of powering of the motor or charging of the accumulation means by the inverter, wherein the switching means are incorporated into the inverter and comprise at least one H-bridge structure for each phase of the motor, and wherein, in the charging of the accumulation means by the inverter, the accumulation means is charged from an electricity network by using the windings of the alternating-current motor as an inductor and by using a midpoint of the at least one H-bridge structure as a connecting point for the electricity network.

2. The electric device as claimed in claim 1, comprising a DC/DC converter between the at least one H bridge structure and the accumulation means, wherein the DC/DC converter allows for matching the voltage of an outside power supply network to characteristics of the accumulation means.

3. The electric device as claimed in claim 1, wherein the motor is a three-phase motor, resulting in the switching means comprising three H bridges.

4. A combined powering and charging method for the application of the device as claimed in claim 3, the method comprising: in the event of loss of one phase of the three-phase motor, controlling inversion of one of the other two phases to generate a single rotating field with constant amplitude.

5. The electric device as claimed in claim 1, further comprising locking means for preventing access to an electric power outlet for connection to the outside power supply network in the event of the device being powered up.

6. The electric device as claimed in claim 5, wherein the electric power outlet provides grounding of the electric device.

7. A combined powering and charging method for the application of the device as claimed in claim 1, the method comprising:
   controlling the switching means of said at least one H bridge to switch from a first mode for powering the motor to a second mode for charging the accumulation means, and vice versa,
   wherein the second charging mode comprises the charging of the accumulation means from the electricity network by using the windings of the alternating-current motor as an inductor, and
   wherein the electricity network is an outside electricity network.

8. The electric device as claimed in claim 1, wherein the electricity network is outside of the electric device.

9. A combined electric device for powering and charging, comprising: an alternating-current motor; an inverter; accumulation means; and switching means for allowing one of powering of the motor or charging of the accumulation means by the inverter, wherein the switching means are incorporated into the inverter and comprise at least one H-bridge structure for each phase of the motor, and the device comprising a connector element allowing a connection to an electricity network power outlet, said connector element being connected to at least a phase of the motor and by using a midpoint of the at least one H-bridge structure as a connecting point for the electricity network.

10. The electric device as claimed in claim 9, wherein the motor is a three-phase motor, resulting in the switching means comprising three H bridges.

11. A combined powering and charging method for the application of the device as claimed in claim 10, the method comprising:
   in the event of loss of one phase of the three-phase motor, controlling inversion of one of the other two phases to generate a single rotating field with constant amplitude.

12. A combined powering and charging method for the application of the device as claimed in claim 9, the method comprising:
   controlling the switching means of said at least one H bridge to switch from a first mode for powering the motor to a second mode for charging the accumulation means, and vice versa, wherein
   the second mode comprises connecting the connector element to the electricity network power outlet so as to charge the accumulation means from the electricity network by using the windings of the alternating-current motor as an inductor.

13. The electric device as claimed in claim 9, wherein the electricity network is outside of the electric device.

* * * * *